July 4, 1939.   J. A. J. BENNETT   2,164,678
ROTARY BLADE OR WING FOR AIRCRAFT
Filed Oct. 15, 1936

INVENTOR James Allan Jamieson Bennett
ATTORNEYS Symmestvedt & Lechner

Patented July 4, 1939

2,164,678

UNITED STATES PATENT OFFICE 2,164,678

ROTARY BLADE OR WING FOR AIRCRAFT

James Allan Jamieson Bennett, Esher, England, assignor, by mesne assignments, to Autogiro Company of America, a corporation of Delaware Application October 15, 1936, Serial No. 105,794
In Great Britain October 15, 1935

2 Claims. (Cl. 244—123)

The present relation relates to blades for aircraft sustaining rotors.

While not necessarily restricted thereto the invention is directed more particularly to the provision of an improved rotor blade for an aircraft with an autorotative sustaining rotor of the kind in which the blades are articulated to the hub member for "flapping", i. e. independent movement in the plane containing the axis of rotation and preferably articulated to the hub for independent swinging movements in the plane of rotation as well. The control in flight of aircraft having sustaining rotors of this kind is now frequently effected by controllably varying the inclination of the axis of rotation both longitudinally and transversely. In such an arrangement, which may be termed a "direct control" rotor, the rotor serves not only as the sustaining element of the aircraft but also as the principal controlling device.

Among the objects of the invention is the provision of an improved rotor blade for a sustaining rotor of the direct control kind in which improved blade the torsional stiffness is much greater than in the hitherto known blade structures. The advantages of torsional rigidity in a rotor blade for a direct control aircraft sustaining rotor may briefly be stated as follows:—

(1) A direct control rotor with blades whose torsional stiffness is of the order hitherto usual is found in practice to be unstable in the longitudinal plane so that the control column becomes nose heavy, i. e. tends to pull the pilot's hand forward as the forward speed of the aircraft increases and vice versa.

However, a marked increase of torsional stiffness of the rotor blades eliminates this defect and causes the longitudinal stability of the rotor to be positive so that the aircraft tends to become tail heavy with increase of forward speed and in such a case the usual horizontal stabilising tail plane may be reduced in size or even dispensed with. In such a case the rotor is not only sustaining and "directly controlling" but also "directly stabilising".

(2) The choice of the best design of rotor blades from the standpoint of performance has hitherto been limited by considerations of torsional flexibility. A notable increase of torsional stiffness gives the designer much greater freedom in his choice of dimensions. For example, an extended range of solidity values becomes available to the designer, i. e. an increase of torsional stiffness permits smaller values of the solidity ratio (i. e. the ratio of blade area to disc area) than were hitherto possible and it is known that a reduction of the solidity ratio of the blade improves the performance of the aircraft.

(3) It is desirable for various reasons arising from the complex aerodynamic and mechanical regime under which the rotor blades operate, and more especially in rotors provided with means enabling the pitch of the blades to be automatically adjustable in flight in response to variations of the various forces, viz. thrust, torque, centrifugal force, etc. acting thereon, that the pitching moment characteristic of the blade should be negative, i. e. tending to decrease the pitch angle, and for this purpose it is necessary that the mean centre of pressure of the blade should lie further from the leading edge than its mass centre.

For structural reasons it has hitherto been found that the simplest way of obtaining this condition is to utilise the expedient of artificially loading the leading edge of the blades in the region of the tip and the resulting offsetting of the mass centre of the blade from the neutral line of the main spar or longitudinal structural member aggravates the detrimental effect of deficient torsional stiffness.

In a preferred embodiment of the improved blade of the present invention this disadvantage is to some extent overcome by placing the central axis of the structural spar closer to the leading edge than hitherto, thus eliminating the need for artificially loading the leading edge or at least reducing the magnitude of the additional masses which must be used for this purpose. On the other hand, even if the design conditions, for instance the aerofoil section adopted, are such as effectively to rule out the setting of the structural spar so far forward towards the leading edge that mass loading of the leading edge is unnecessary, the greatly increased torsional stiffness of the improved blade renders the offsetting of the mass centre from the neutral line of the structural member much less detrimental than hitherto has been the case.

The objects of this invention therefore include a sustaining rotor blade of high torsional rigidity and preferably with the centre line of its structural spar set nearer the leading edge than hitherto usual. The attainment of these objects is at the same time subject to the general requirement that any substantial increase of blade weight and any serious limitation on the aerofoil section employed are not tolerable.

In the present invention these objects are achieved by the use, in place of the hitherto usual cylindrical tubular main spar, of a main spar or longitudinal structural member of tubular construction having a cross section elongated in the direction of the chord. In this way for the same weight of metal in the tubular spar a greatly increased torsional stiffness is obtained and an increase of flexural stiffness in the plane of the chord which is desirable, while the flexural stiffness in the plane perpendicular to the chord is not materially increased and this meets the requirements of the case, as a relatively low flexural stiffness in the plane perpendicular to the chord is advantageous.

The cross section of the tubular spar, which may be solid drawn or built up, may conveniently be of generally oval shape and preferably the minimum radius of curvature occurring at the ends of the major axis is not less than one-third of the minor axis.

In the improved blade of the present invention the superstructure, including forming ribs, is mounted on the oval or elongated section tubular spar and the blade covering, of which the leading part extending as far back at least as the trailing margin of the spar consists of a stiff material, e. g. plywood, is supported on the said superstructure and spaced thereby from the tubular spar member at all points of the latter's periphery. The reason for specifying a minimum limit on the radius of curvature of the tubular spar is that very sharp radii in a tubular member may have the effect of weakening the structure in that the material at such points may be seriously weakened in the operations of forming the tube and that it is desirable to avoid the necessity for heat treating the spar after forming into shape to remove the effect of excessive work hardening and to relieve local concentrations of initial stress.

The invention consists in all the novel or improved features, combinations or arrangements herein mentioned, shown or described, either severally or any combination thereof, and is not limited to what is herein particularly described and ascertained but includes such modifications as may readily occur to those skilled in the art.

An embodiment of this invention is hereinafter described with reference to the accompanying drawing.

In the drawing:—

Figure 1:
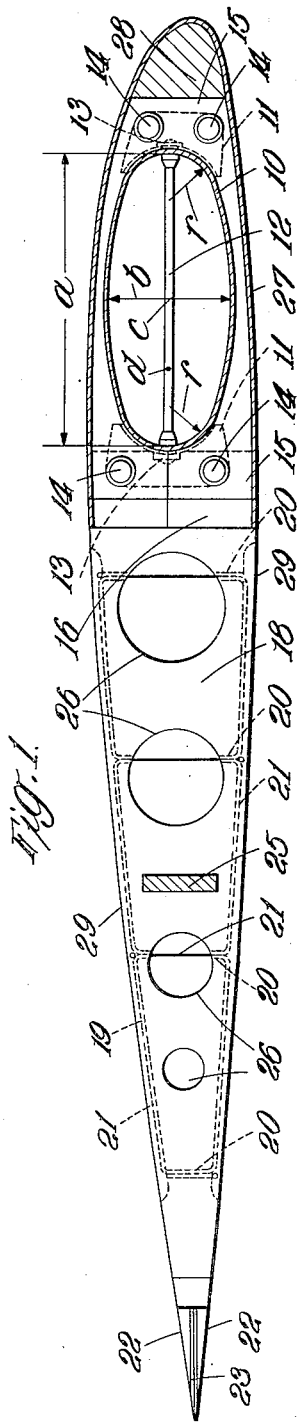
Fig. 1 shows the improved rotor blade in transverse cross section.
Figure 2:
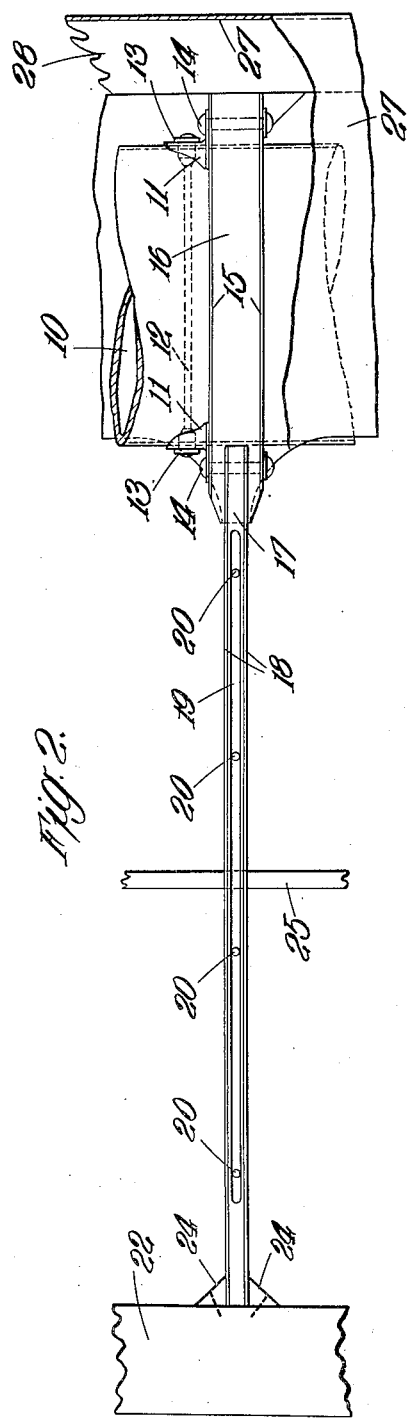
Fig. 2 is a fragmentary view showing a part of the improved rotor blade in plan with the covering partially removed.

Referring to the drawing; the main structural member of the blade is in this instance a solid drawn metallic tube 10, preferably steel, having an oval cross section of which the major axis $a$ is in this instance about 2.4 times the minor axis $b$. The minimum radius of curvature $r$ occurring at the ends of the major axis is not less than one-third the dimension $b$. The major axis of the oval section is parallel to the chord of the aerofoil section of the blade but absolute parallelism is not essential to the invention, a slight obliquity of the major axis of the spar section to the chord being permissible and in certain instances desirable according to the aerofoil section employed and other relevant considerations. On this tubular spar 10 are mounted rib clips 11 in the form of sheet metal pressings which are secured by means of threaded rods 12 and screwed ferrules or shanked nuts 13. To these rib clips 11 are secured the ribs, each of which consists of two parts, a forward and a rear part. The forward part consists of a block of spruce 16, the sides of which are faced with plywood 15 and which is threaded on the spar and secured by rivets 14 to the clips 11. The rear part of the rib is constituted by a spruce member 17 with plywood facing 18 which is inserted and glued into a slot in the rear of trailing end of the block 16 and through which the rear pair of rivets 14 pass. The top and bottom edges of the spruce member 17 are grooved at 19 and the spruce member 17 is perforated at 20 to receive the cord 21 with which the fabric covering of the trailing part of the blade is secured. The trailing part of the rib is furnished with lightening holes 26. The trailing edge former consists of spruce members 22 and plywood centre 23 all glued together and attached to the trailing ends of the ribs by gluing and by means of small plywood gussets 24. About half way between the spar tube and the trailing edge member is arranged an alignment spar or stringer 25 which is passed through slots in the trailing parts of the ribs. The forward part of the blade is provided with a stiff plywood covering 27 which is glued on to the forward rib blocks 16 and encloses a solid spruce nose former 28 glued to the forward end of the blocks 16. The fabric covering 29 is carried right over the nose former and secured by stringing with cord 21 to the trailing part of the ribs in the usual way and the stringing protected by fabric cover strips (not shown) doped on to the outside of the fabric and the whole doped in the usual manner.

The centre of the tubular spar at $c$ is considerably nearer the leading edge than the point $d$ which lies at 25% of the chord and the mass centre of the whole blade is only slightly in rear of the point $c$, as the tubular spar accounts for the greater part of the weight of the blade.

It will be seen that the blade covering 27 is spaced from the tubular spar 10 at all points of the latter's periphery by the rib blocks 16, although at the ends of the minor axis of the spar tube the approach of the blade covering to the spar is fairly close.

What I claim is:

1. For an aircraft sustaining rotor, a rotor blade having a main longitudinal structural member of one-piece tubular construction and of substantially oval cross section, extending throughout most of the length of the blade; and ribs at intervals along the blade each comprising a solid block apertured to receive the main structural member, clips secured to either end of said block, and a truss-like trailing member secured to one of said clips; and means cooperating with said clips to secure the ribs on the spar.

2. For an aircraft sustaining rotor, a rotor blade having a main longitudinal structural member of one-piece tubular construction and of substantially oval cross section, extending throughout most of the length of the blade; ribs at intervals along the blade each comprising a solid block apertured to receive the main structural member, clips secured to either end of said block, and a truss-like trailing member secured to one of said clips; and a longitudinally extending nose piece secured to the other of said clips along a series of said ribs.

JAMES ALLAN JAMIESON BENNETT.